United States Patent
Maehama et al.

(10) Patent No.: US 11,763,035 B2
(45) Date of Patent: Sep. 19, 2023

(54) SOFTWARE MANAGEMENT DEVICE

(71) Applicant: Hitachi Astemo, Ltd., Hitachinaka (JP)

(72) Inventors: Hiroki Maehama, Hitachinaka (JP);
Fumio Narisawa, Hitachinaka (JP);
Satoshi Otsuka, Tokyo (JP);
Kazuyoshi Serizawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 227 days.

(21) Appl. No.: 17/290,456

(22) PCT Filed: Oct. 16, 2019

(86) PCT No.: PCT/JP2019/040566
§ 371 (c)(1),
(2) Date: Apr. 30, 2021

(87) PCT Pub. No.: WO2020/090454
PCT Pub. Date: May 7, 2020

(65) Prior Publication Data
US 2022/0035954 A1 Feb. 3, 2022

(30) Foreign Application Priority Data
Nov. 1, 2018 (JP) .................................. 2018-206377

(51) Int. Cl.
*G06F 9/44* (2018.01)
*G06F 21/70* (2013.01)
(Continued)

(52) U.S. Cl.
CPC ................ *G06F 21/70* (2013.01); *G06F 8/20* (2013.01); *G06F 8/35* (2013.01); *G06F 8/72* (2013.01)

(58) Field of Classification Search
CPC ... G06F 21/70; G06F 8/20; G06F 8/35; G06F 8/72; G06F 17/30292
See application file for complete search history.

(56) References Cited

U.S. PATENT DOCUMENTS 7,941,438 B2 * 5/2011 Molina-Moreno ....... G06F 8/35
717/109
10,209,974 B1 * 2/2019 Patton ...................... G06F 8/60
(Continued)

FOREIGN PATENT DOCUMENTS

JP H06-050778 A 2/1994
JP 2010-122745 A 3/2010
(Continued)

OTHER PUBLICATIONS

Cincy Dooling et al., Software Management, Nov. 5-8, 2006, [Retrieved on Apr. 20, 2023]. Retrieved from the internet: <URL: https://dl.acm.org/doi/pdf/10.1145/1181216.1181237> 5 Pages (89-93) (Year: 2006).*
Extended European Search Report issued in corresponding EP Application No. 19880642.4 dated May 19, 2022 (8 pages).
Muhammad Naeem et al: "Towards matching of service feature models based on linear logic", SPLC '11: Proceedings of the 15th International Software Product Line Conference, vol. 2, ACM, 2 Penn Plaza, Suite 701 New York NY 10121-0701 USA, Aug. 21, 2011 (Aug 21, 2011), pp. 1-8.
(Continued)

*Primary Examiner* — Anibal Rivera
(74) *Attorney, Agent, or Firm* — Foley & Lardner LLP

(57) ABSTRACT

A software management device capable of converting a term used in a model and an abstraction level thereof. The software management device includes an input unit that inputs a target model, a storage unit that hierarchically stores functions and/or names constituting the model, and an in-model name replacement unit that selects a corresponding function and/or name from the storage unit according to the input model input from the input unit, and replaces a function and/or a name in the input model with the selected function and/or name.

9 Claims, 7 Drawing Sheets

(51) Int. Cl.
  *G06F 8/20* (2018.01)
  *G06F 8/35* (2018.01)
  *G06F 8/72* (2018.01)

(56) References Cited

U.S. PATENT DOCUMENTS

| | | | |
|---|---|---|---|
| 10,268,709 B1* | 4/2019 | Suehs | G06F 16/211 |
| 2008/0092111 A1* | 4/2008 | Kinnucan | G06F 8/10 |
| | | | 717/105 |
| 2010/0280863 A1* | 11/2010 | Wilcock | G06Q 10/067 |
| | | | 705/348 |
| 2015/0100942 A1* | 4/2015 | Misbhauddin | G06F 8/20 |
| | | | 717/104 |
| 2015/0269383 A1* | 9/2015 | Lang | H04L 63/20 |
| | | | 726/1 |

FOREIGN PATENT DOCUMENTS

| | | |
|---|---|---|
| JP | 2014-092920 A | 5/2014 |
| JP | 2014-241056 A | 12/2014 |

OTHER PUBLICATIONS

Oliveira K et al: "Ontology Aided Model Comparison", Engineering of Complex Computer Systems, 2009 14th IEEE International Conference On, IEEE, Piscataway, NJ, USA, Jun. 2, 2009 (Jun. 2, 2009), pp. 78-83.

International Search Report with English translation and Written Opinion issued in corresponding application No. PCT/JP2019/040566 dated Feb. 10, 2020.

* cited by examiner

SOFTWARE MANAGEMENT DEVICE

TECHNICAL FIELD

The present invention relates to the design and management of software and system models, and particularly to a software management device.

BACKGROUND ART

In the design and management of software and systems, for example, a technique described in PTL 1 is proposed as a technique for converting a created model.

An object of PTL 1 is to provide a class diagram conversion device and a class diagram conversion program which support design of a class diagram with an optimum design pattern when reviewing a class diagram once created. Therefore, the class diagram conversion device identifies a pattern as an application location of class diagram conversion selected by a designer or the like based on a pattern determination logic, and displays one or more converted patterns that can be converted for the identified pattern on a display device. Then, the class diagram conversion device can convert a class diagram before conversion indicated by selection information of the application location into the pattern after conversion selected by the designer or the like and display the resultant on the display device. Accordingly, the designer or the like can select the optimum converted pattern from among one or more converted patterns displayed on the display device, and thus, the class diagram can be converted without requiring advanced knowledge about each pattern (design pattern), which is disclosed in PTL 1.

CITATION LIST

Patent Literature

PTL 1: JP 2014-092920 A

SUMMARY OF INVENTION

Technical Problem

Since a plurality of models created by different designers have different terms and abstraction levels (depths of concept hierarchy), it is difficult to extract a difference or a common part, and it is necessary to convert the models for comparison.

However, the technique disclosed in PTL 1 for converting the model does not assume conversion of a term used in the model. Therefore, it is difficult to compare a plurality of models created by different designers.

Therefore, the present invention provides a software management device capable of converting a term used in a model and an abstraction level thereof.

Solution to Problem

In order to solve the above problems, a software management device according to the present invention includes: an input unit that inputs a target model; a storage unit that hierarchically stores functions and/or names constituting the model; and an in-model name replacement unit that selects a corresponding function and/or name from the storage unit according to the input model input from the input unit, and replaces a function and/or a name in the input model with the selected function and/or name.

Advantageous Effects of Invention

According to the present invention, it is possible to provide the software management device capable of converting the term used in the model and the abstraction level thereof.

Other objects, configurations, and effects which have not been described above become apparent from embodiments to be described hereinafter.

DESCRIPTION OF EMBODIMENTS

In the present specification, among functions and/or names constituting a model, the "name" includes the connection relationship between the respective functions included in the model or mutually transmitted and received signals.

Further, regarding an "abstraction level", for example, when a term used in a model is a name indicating a function, a level of a hierarchy of a hierarchical structure from a subordinate concept to a superordinate concept of the function name is defined as the abstraction level. Alternatively, when a name indicating a function is stored in a tree structure, a hierarchical level of the tree is defined as the abstraction level. Note that the abstraction level is sometimes referred to as a depth of a concept hierarchy.

Hereinafter, embodiments of the present invention will be described with reference to the drawings.

First Embodiment

Figure 1:
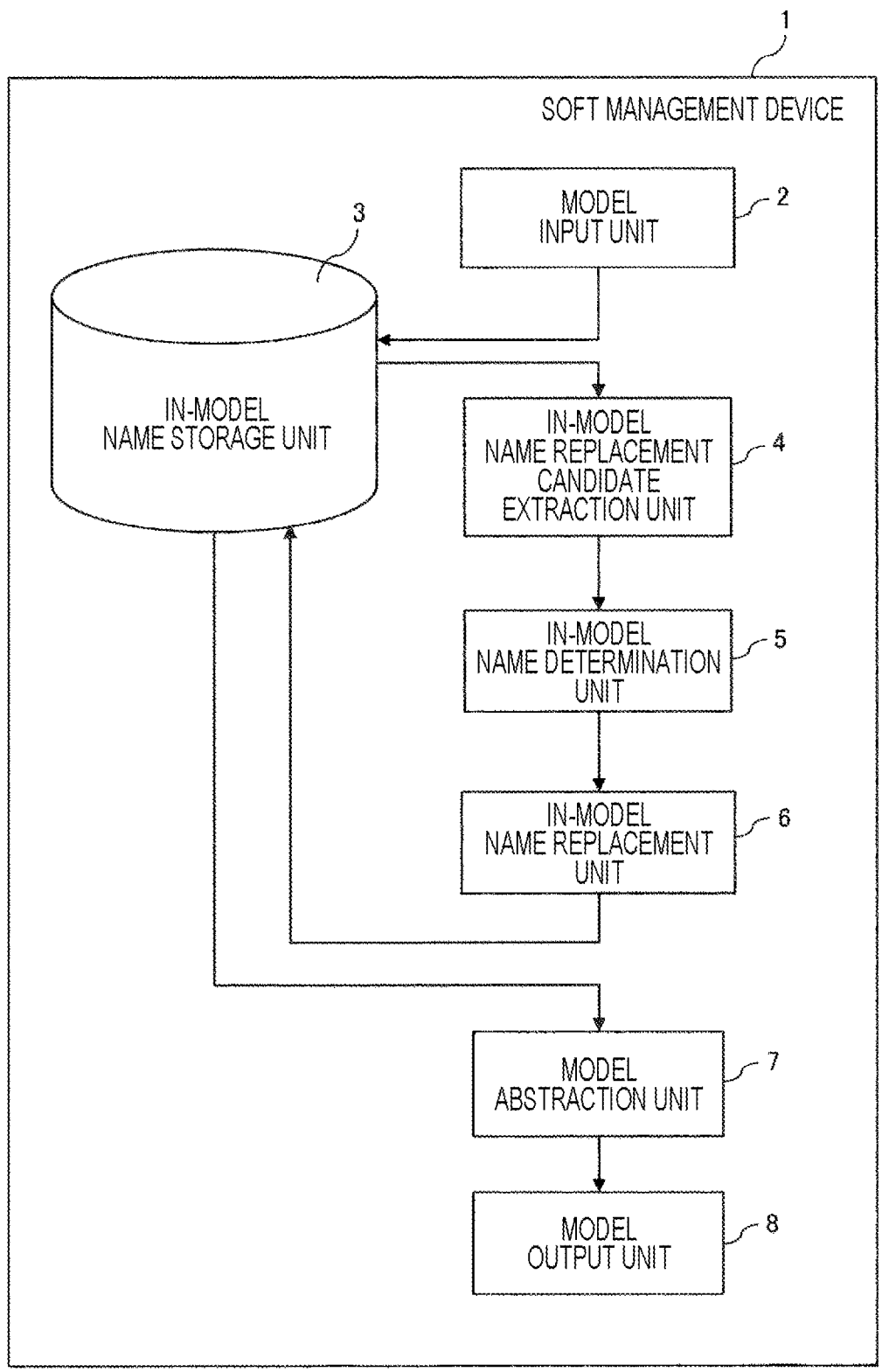
FIG. 1 is a functional block diagram illustrating a schematic configuration of a software management device according to a first embodiment of the present invention.

FIG. 1 is a functional block diagram illustrating a schematic configuration of a software management device according to a first embodiment of the present invention. As illustrated in FIG. 1, a software management device 1 includes a model input unit 2, an in-model name storage unit 3, an in-model name replacement candidate extraction unit 4, an in-model name determination unit 5, an in-model name replacement unit 6, a model abstraction unit 7, and a model output unit 8. The model input unit 2 receives an input of a model that a user desires to convert. The in-model name storage unit 3 hierarchically stores same words and synonyms according to an abstraction level (depth of concept hierarchy) for names and/or functions of each element described in a model as a comparison reference and terms of subordinate and superordinate concepts thereof. The in-model name replacement candidate extraction unit 4 extracts corresponding replacement candidates from the names stored in the in-model name storage unit 3 for the names and/or functions of each element described in the model input by the user via the model input unit 2. That is, the in-model name replacement candidate extraction unit 4 has a function of selecting the corresponding names and/or functions as replacement candidates from the in-model name storage unit according to the input model. The in-model name determination unit 5 determines a function and/or name to be replaced from the replacement candidates extracted by the in-model name replacement candidate extraction unit 4. The in-model name replacement unit 6 replaces the function and/or name in the model input via the model input unit 2 with the function and/or name determined by the in-model name determination unit 5. The model abstraction unit 7 abstracts a model abstracts performs model abstraction of the model in which the function and/or names of the described elements have been replaced in the in-model name replacement unit 6 to a similar abstraction level with the comparison reference model using a hierarchical structure, which will be described in detail, of the in-model name storage unit 3. The model output unit 8 outputs the model abstracted by the model abstraction unit 7.

The in-model name replacement candidate extraction unit 4, the in-model name determination unit 5, the in-model name replacement unit 6, and the model abstraction unit 7 are realized by, for example, a processor such as a central processing unit (CPU) (not illustrated), a ROM that stores various programs, a RAM that temporarily stores data in an arithmetic process, and a storage device such as an external storage device. The processor such as the CPU reads and executes the various programs stored in the ROM, and stores a calculation result, which is an execution result, in the RAM or the external storage device.

Figure 2:
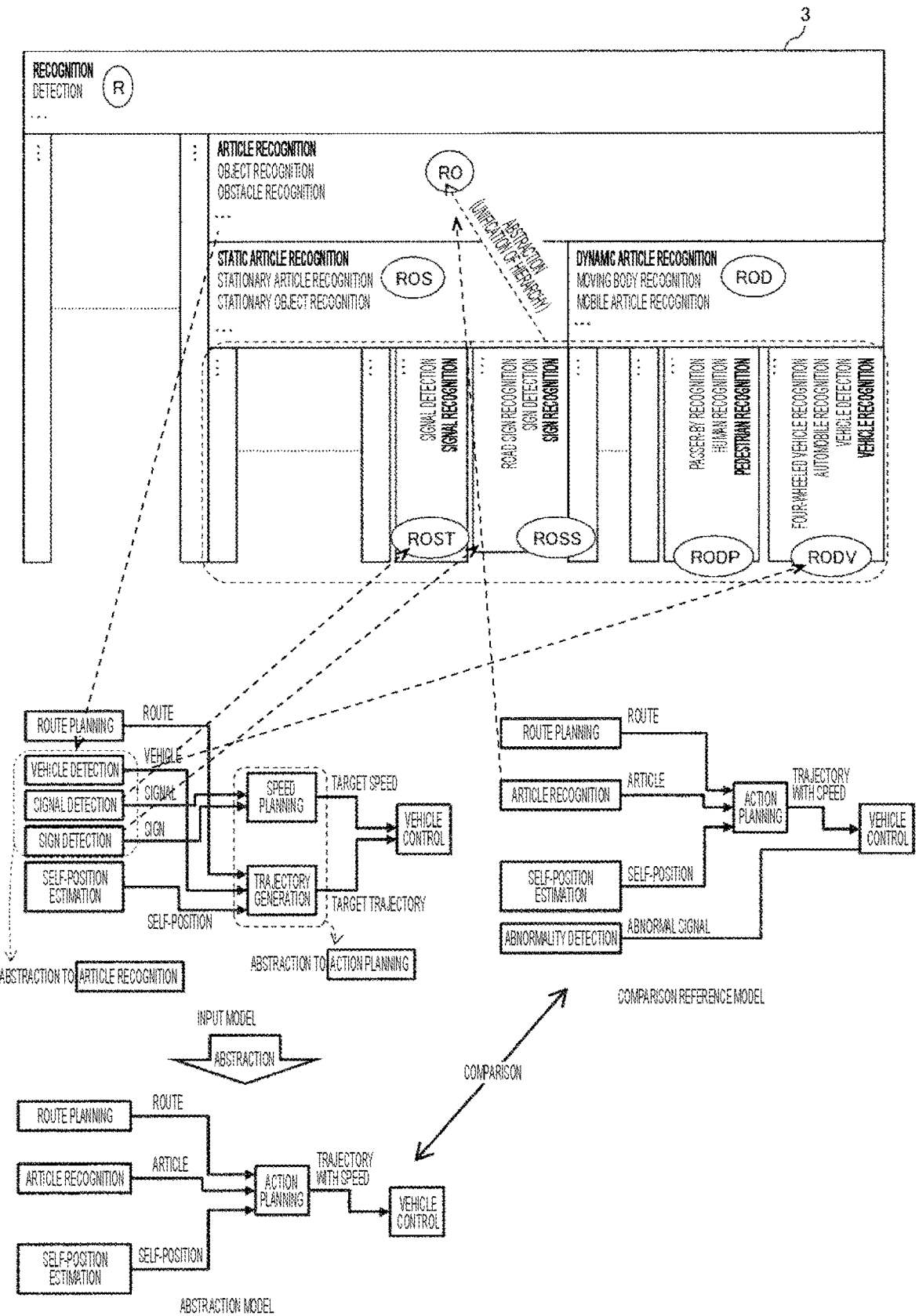
FIG. 2 is a view illustrating a data structure, an input model, a comparison reference model, and an abstraction model of an in-model name storage unit illustrated in FIG. 1, using a recognition function of an automatic driving system as an example.

FIG. 2 is a view illustrating a data structure, an input model, a comparison reference model, and an abstraction model of the in-model name storage unit 3 illustrated in FIG. 1, using a recognition function of an automatic driving system as an example. In order to facilitate understanding of the description in FIG. 2, the input model input via the in-model name storage unit 3 and the model input unit 2, the comparison reference model, and the abstraction model are illustrated in the same drawing. Note that, regarding the comparison reference model, a storage area may be provided in the in-model name storage unit 3, and the comparison reference model may be stored in the storage area. Instead, the comparison reference model may be stored in a storage unit (not illustrated) different from the in-model name storage unit 3. Further, the comparison reference model may be a model created and stored in the past or a model input via the model input unit 2. The case of the model input via the model input unit 2 in this manner assumes, for example, a case where a user inputs two types of models via the model input unit 2 as the models, one model is used as the input model, and the other model is used as the comparison reference model.

As illustrated in FIG. 2, the data structure of the in-model name storage unit 3 is an example of the recognition function of the automatic driving system. Thus, for example, when terms used in the model are names indicating functions, "recognition", "detection", and the like are stored in the in-model name storage unit 3 as a superlative concept (cell: R). Further, "article recognition", "object recognition", "obstacle recognition", and the like are stored in a subordinate concept one level below, that is, a hierarchy (cell: RO) one level below the superlative concept (cell: R). A subordinate concept one level below, that is, a hierarchy one level below this hierarchy (cell: RO) stores "static article recognition", "stationary article recognition", "stationary object recognition", and the like (cell: ROS), and "dynamic article recognition", "moving body recognition", "mobile article recognition", and the like (cell: ROD), in the same hierarchy.

A subordinate concept one level below "static article recognition", "stationary article recognition", "stationary object recognition", and the like (cell: ROS), that is, the lowest hierarchy stores "signal detection" and "signal recognition, and the like (cell: ROST), and "road sign recognition", "sign detection", "sign recognition", and the like (cell: ROSS).

A subordinate concept one level below "dynamic article recognition", "moving body recognition", "mobile article recognition", and the like (cell: ROD), that is, the lowest hierarchy stores "passer-by recognition", "human recognition", "pedestrian recognition", and the like (cell: RODP), and "four-wheeled vehicle recognition", "automobile recognition", "vehicle detection", "vehicle recognition", and the like (cell: RODV).

Figure 3:
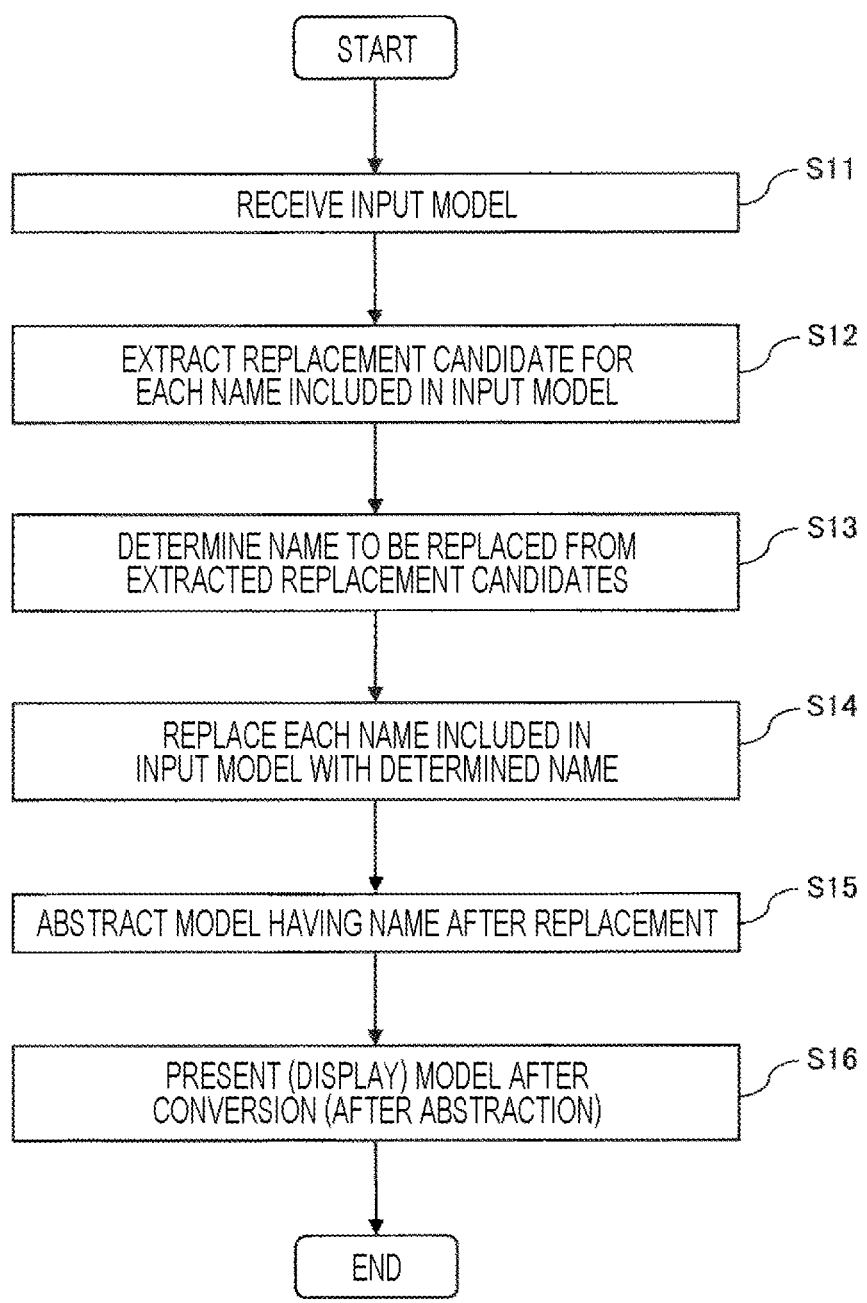
FIG. 3 is a flowchart illustrating a processing flow of the software management device illustrated in FIG. 1.

Next, an operation of the software management device 1 will be described. FIG. 3 is a flowchart illustrating a processing flow of the software management device 1 illustrated in FIG. 1.

An example applied to a model of a logical architecture of the automatic driving system will be described hereinafter.

In Step S11, the model input unit 2 constituting the software management device 1 receives a model input by the user. Note that it is assumed that the model input by the user is the input model illustrated in FIG. 2.

In Step S12, the in-model name replacement candidate extraction unit 4 constituting the software management device 1 extracts a replacement candidate from the in-model name storage unit 3 for each name included in the model input in Step S11 described above. In the extraction of replacement candidates, a matching name is searched for from the lowest hierarchy of the in-model name storage unit 3. If there is no matching name in the lowest hierarchy, the same search is performed in a hierarchy one level higher, and the search and an increase in level of the hierarchy to be searched are repeated until a matching name is found or no matching name is found up to the highest layer. Here, if no matching name is found up to the highest layer, the name is treated as a name that is not replaced as a unique point of the model. As an example of the replacement candidate extraction, a name in the cell of the in-model name storage unit 3 including "vehicle detection", "signal detection", and "sign detection" constituting the input model is extracted as a candidate for a name to be replaced, for example, in FIG. 2. Specifically, "vehicle recognition", "four-wheeled vehicle recognition", "automobile recognition", and the like stored in the same cell (RODV) are extracted as the candidates for the name to be replaced, for "vehicle detection". For "signal detection", "signal recognition" and the like stored in the same cell (ROST) are extracted as the candidates for the name to be replaced. Further, "sign recognition", "road sign recognition", and the like stored in the same cell (ROSS) are extracted as the candidates for the name to be replaced, for "sign detection".

In Step S13, the in-model name determination unit 5 constituting the software management device 1 determines a name to be replaced from among the above replacement candidates obtained for the respective names included in the model input in Step S11. For example, in FIG. 2, a name in the comparison reference model is referred to, and "vehicle recognition" is determined as the name to be replaced for "vehicle detection" in the in-model name storage unit 3. Since "detection" in a human-power model corresponds to "recognition" in the comparison reference model, "vehicle recognition" is determined as the name to be replaced for "vehicle detection" as described above. Similarly, "signal recognition" is determined as the name to be replaced for "signal detection", and "sign recognition" is determined as the name to be replaced for "sign detection". Note that the name to be replaced for the purpose of automatic model comparison and prevention of notation fluctuation may be selected as a symbol for identifying a cell as illustrated in FIG. 2, for example, "RO" for article recognition).

In Step S14, the in-model name replacement unit 6 constituting the software management device 1 replaces each name included in the input model with the name determined in Step S13 described above. For example, in FIG. 2, "vehicle detection", "signal detection", and "sign detection" constituting the input model are replaced with "vehicle recognition", "signal recognition", and "sign recognition", respectively.

In Step S15, the model abstraction unit 7 constituting the software management device 1 abstracts the model obtained in Step S14 described above to match an abstraction level of the comparison reference model using the hierarchical structure of the in-model name storage unit 3. As illustrated in FIG. 2, for example, in the hierarchical structure of the in-model name storage unit 3, abstraction is performed by integrating a plurality of elements having the same name in a higher hierarchy into one element (unification of the hierarchy). For example, in FIG. 2, in the input model in which names have been replaced, "vehicle recognition" (cell RODV), "signal recognition" (cell ROST), and "sign recognition" (cell ROSS) are abstracted as "article recognition" (cell RO) in a higher hierarchy of these. As a result, for example, it is possible to unify the abstraction level of two models having different abstraction levels in which the number of logical functions is remarkably different, and it is possible to extract a common part and a difference from the above two models.

In Step S16, the model output unit 8 constituting the software management device 1 presents (displays) the converted model (model after abstraction) to the user.

Note that the names in the model can be automatically replaced by performing Step S12 as described above. On the other hand, the user may manually select a name to be replaced from the in-model name storage unit 3 in Step S13 when no replacement candidate is found up to the highest layer in Step S12 although it is not fully automatic.

Further, the replacement of the name has been described in the present embodiment, but a function constituting a model may be replaced, or the function constituting the model and a name of each element may be replaced without being limited to the replacement of the name.

As described above, according to the present embodiment, it is possible to provide the software management device capable of converting the term used in the model and the abstraction level thereof.

Second Embodiment

Figure 4:
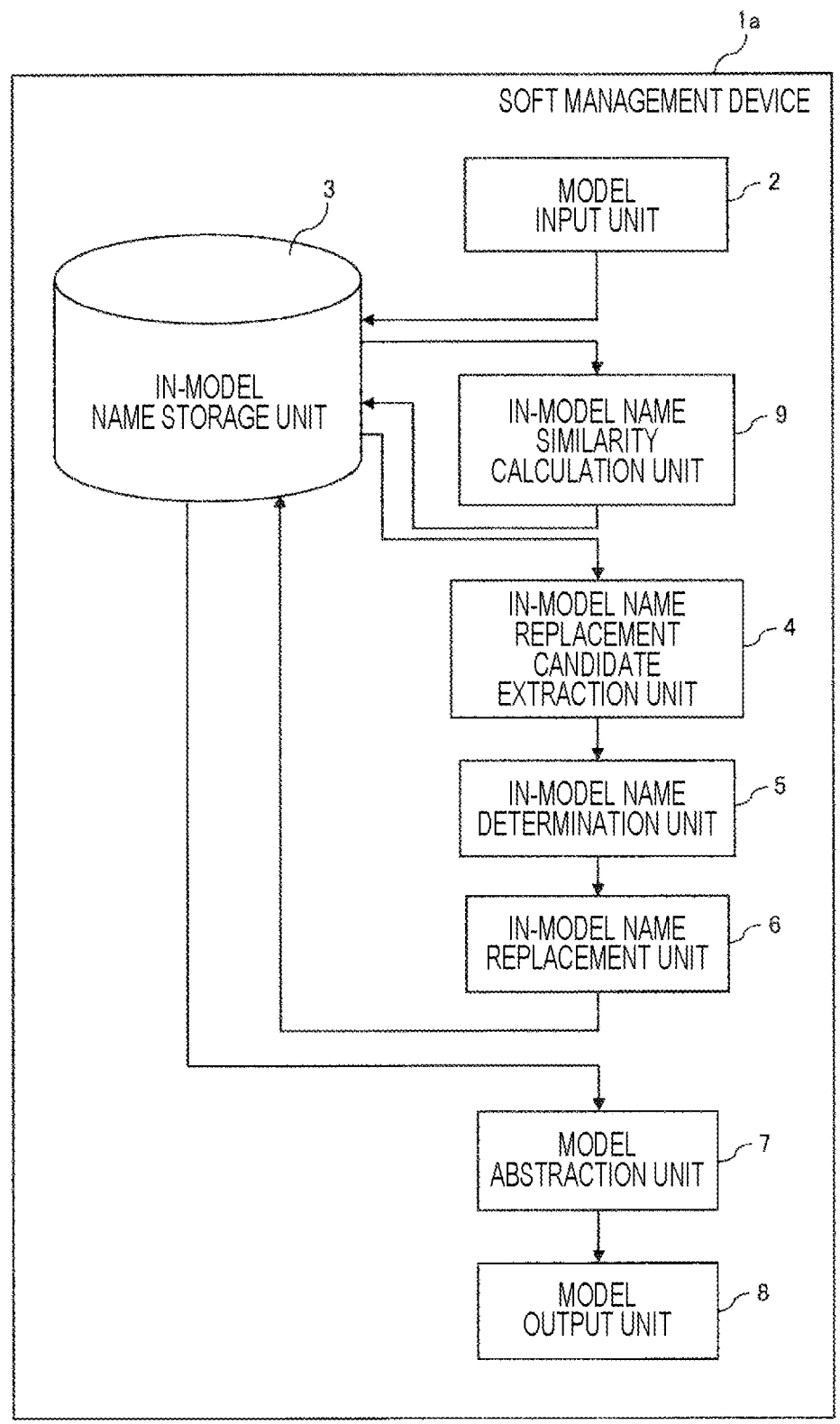
FIG. 4 is a functional block diagram illustrating a schematic configuration of a software management device of a second embodiment according to another embodiment of the present invention.

FIG. 4 is a functional block diagram illustrating a schematic configuration of a software management device of a second embodiment according to another embodiment of the present invention. The present embodiment is different from the first embodiment in that a software management device 1a is configured to further include an in-model similarity calculation unit 9. Other configurations are the same as those in the above-described first embodiment. Hereinafter, the same components as those in the first embodiment are designated by the same reference numerals, and the description overlapping with the first embodiment will be omitted.

As illustrated in FIG. 4, the software management device 1a additionally includes the in-model name similarity calculation unit 9 in addition to the software management device 1 illustrated in the first embodiment. The software management device 1a according to the present embodiment is an embodiment in which the software management device 1a extracts a plurality of replacement candidates for each name included in an input model in Steps S12 and S13 in the processing flow of the software management device 1 according to the above-described first embodiment, presents the extracted replacement candidates to a user, and the user selects a name after replacement from the extracted replacement candidates. In Step S12, the extraction of the plurality of replacement candidates is performed by calculating a similarity with a name in the model input via the model input unit 2 as, for example, a minimum edit distance for names included in the in-model name similarity calculation unit 9 in the in-model name storage unit 3, and extracting names with similarities within the top three, for example, from the replacement candidates. In the software management device 1a according to the present embodiment, it is unnecessary for the in-model name storage unit 3 to include a name that matches the name in the input model, and thus, the amount of data that needs to be stored in the in-model name storage unit 3 can be reduced. In other words, in the software management device 1a according to the present embodiment, if a similar name exists in the in-model name storage unit 3, the subsequent abstraction is possible even when the name matching the name in the input model is not included in the model name storage unit 3, and thus, the amount of data that needs to be stored in the in-model name storage unit 3 can be reduced.

According to the present embodiment, the amount of data to be stored in the in-model name storage unit 3 can be reduced as described above, in addition to the effect of the first embodiment.

Third Embodiment

Figure 5:
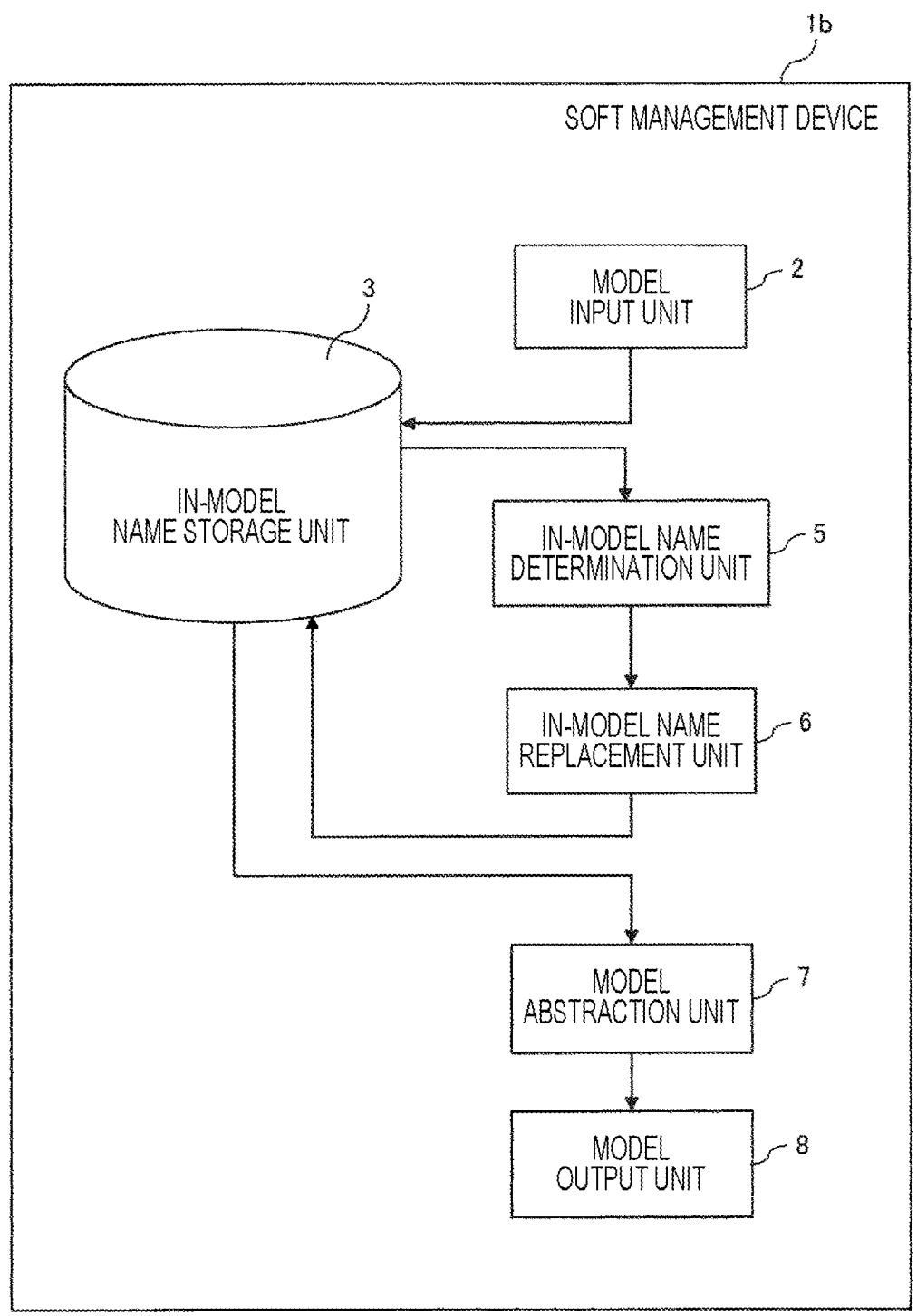
FIG. 5 is a functional block diagram illustrating a schematic configuration of a software management device of a third embodiment according to still another embodiment of the present invention.
Figure 6:
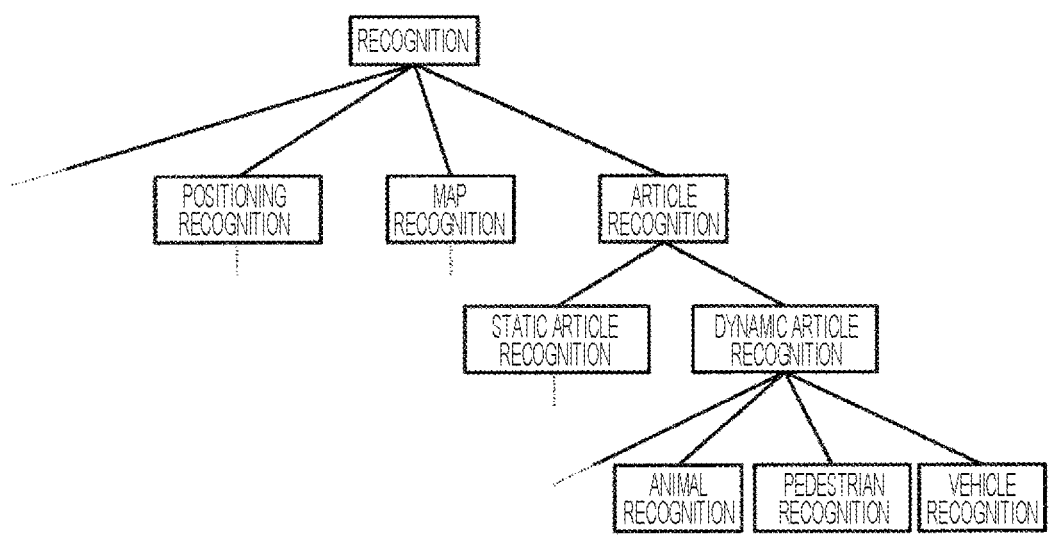
FIG. 6 is a view illustrating a tree structure which is a data structure of the in-model name storage unit illustrated in FIG. 5.

FIG. 5 is a functional block diagram illustrating a schematic configuration of a software management device of a third embodiment according to still another embodiment of the present invention, and FIG. 6 is a view illustrating a tree structure which is a data structure of an in-model name storage unit illustrated in FIG. 5. The present embodiment is different from the first embodiment in that the structure of data stored in the in-model name storage unit 3 is the tree structure, and the in-model name replacement candidate extraction unit 4 is not required. Other configurations are the same as those in the above-described first embodiment. Hereinafter, the same components as those in the first embodiment are designated by the same reference numerals, and the description overlapping with the first embodiment will be omitted.

As illustrated in FIG. 5, a software management device 1b according to the present embodiment includes the model input unit 2, the in-model name storage unit 3, the in-model name determination unit 5, the in-model name replacement unit 6, the model abstraction unit 7, and the model output unit 8. The in-model name storage unit 3 is the tree structure of categories of each element (function) described in a model as a comparison reference. For example, the tree structure illustrated in FIG. 6 can be used for "recognition function" included in a model of an automatic driving system. As illustrated in FIG. 6, the tree structure has a superlative concept of "recognition", and a subordinate concept one level below, that is, a hierarchy one level below the superlative concept branches into "article recognition", "map recognition", "positioning recognition", and the like. A hierarchy one level below the hierarchy of "article recognition" branches into "static article recognition" and "dynamic article recognition". Further, a hierarchy one level below the hierarchy of "dynamic article recognition", that is, the lowest hierarchy branches into "vehicle recognition", "pedestrian recognition", "animal recognition", and the like. The in-model name determination unit 5 allows a user to select a name in a model after replacement using the tree structure of the in-model name storage unit 3 for each name described in the model input via the model input unit 2. The model input unit 2, the in-model name replacement unit 6, the model abstraction unit 7, and the model output unit 8 are the same as those in the first embodiment described above.

Figure 7:
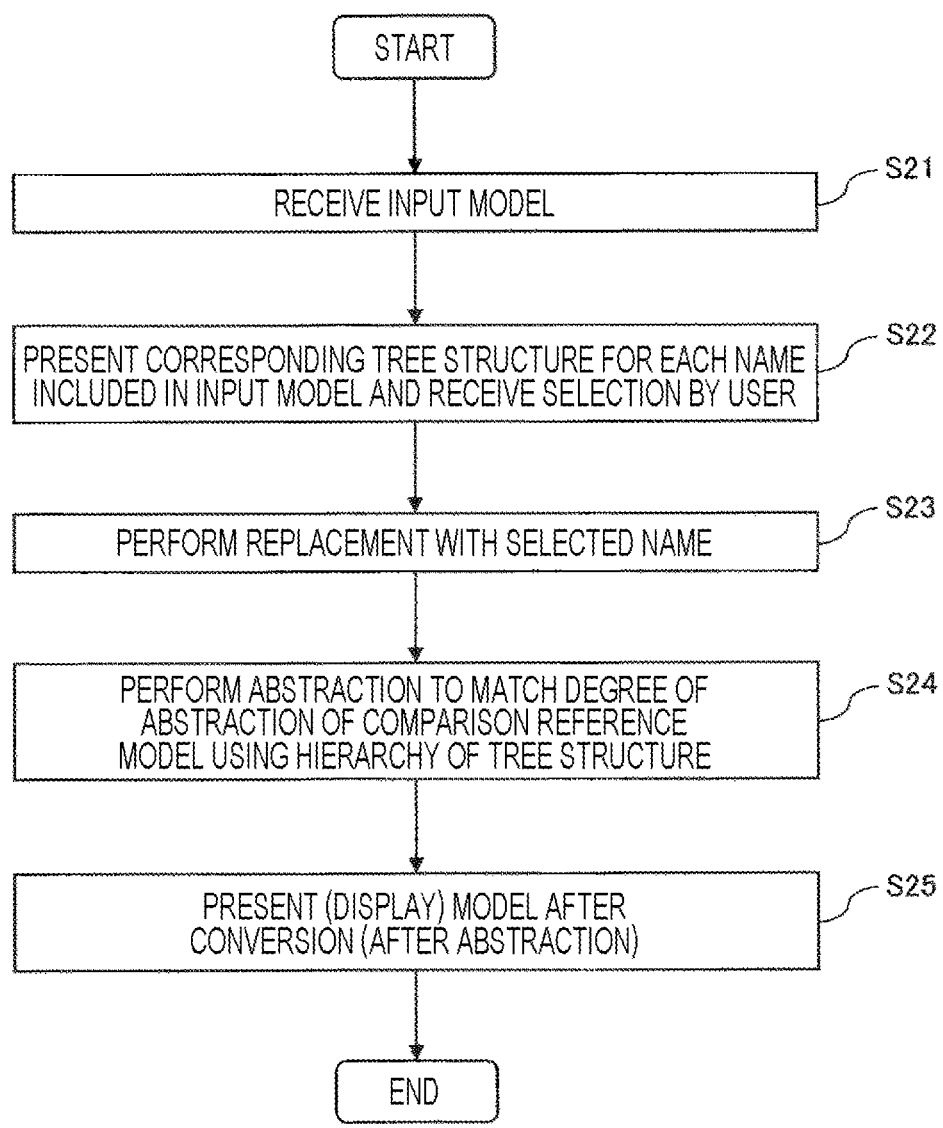
FIG. 7 is a flowchart illustrating a processing flow of the software management device illustrated in FIG. 5.

Next, an operation of the software management device 1b will be described. FIG. 7 is a flowchart illustrating a processing flow of the software management device 1b illustrated in FIG. 5.

In Step S21, the model input unit 2 constituting the software management device 1b receives a model input by the user.

In Step S22, the in-model name determination unit 5 constituting the software management device 1b presents the corresponding tree structure of the in-model name storage unit 3 to the user for each name included in the model input in Step S21 described above, and the user selects a name after replacement following the tree structure from a superordinate concept to a subordinate concept. Here, the presentation of the tree structure to the user is realized by, for example, an interactive screen display.

In Step S23, the in-model name replacement unit 6 constituting the software management device 1b replaces each name included in the input model with the name determined in Step S22 described above.

In Step S24, the model abstraction unit 7 constituting the software management device 1b abstracts the model obtained in Step S23 described above to match an abstraction level of the comparison reference model using the hierarchies of the tree structure of the in-model name storage unit 3.

In Step S25, the model output unit 8 constituting the software management device 1b presents (displays) a converted model (model after abstraction) to the user.

Note that it becomes easy to perform subsequent analysis work of the model, for example, categorization or grouping of elements in the model, by forming the in-model name storage unit 3 as the data structure of the tree structure as in the present embodiment. Further, the amount of data that needs to be stored in the in-model name storage unit 3 can be reduced as compared with the first embodiment described above.

According to the present embodiment, it is possible to facilitate the subsequent analysis work of the model such as categorization and grouping of elements in the model as described above, in addition to the effect of the first embodiment.

Note that the configuration in which Step S15 is executed in the above-described first and second embodiments have described and the configuration in which Step S24 is executed in the third embodiment have been described, the present invention is not limited thereto.

A configuration in which these Steps S15 and S24 are omitted may be adopted.

Further, the configuration in which the comparison reference model is set has been described in the above-described first, second, and third embodiments, but the present invention is not limited thereto. For example, the storage unit may be created or abstracted based on a general conceptual system in this field.

Note that the present invention is not limited to the above-described embodiments, but includes various modifications.

For example, the above-described embodiments have been described in detail in order to describe the present invention in an easily understandable manner, and are not necessarily limited to one including the entire configuration that has been described above. Further, some configurations of a certain embodiment can be substituted by configurations of another embodiment, and further, a configuration of another embodiment can be also added to a configuration of a certain embodiment. Further, addition, deletion or substitution of other configurations can be made with respect to some configurations of each embodiment. Further, a part or all of each of the above-described configurations, functions, processing units, processing means, and the like may be realized, for example, by hardware by designing with an integrated circuit and the like. Further, the above-described respective configurations, functions and the like may be realized by software by the processor interpreting and executing a program for realizing the respective functions. Information such as programs, tables, and files that realize the respective functions can be installed in a recording device such as a memory, a hard disk, and a solid state drive (SSD), or a recording medium such as an IC card, an SD card, and a DVD.

REFERENCE SIGNS LIST 1, 1a, 1b software management device
2 model input unit
3 in-model name storage unit
4 in-model name replacement candidate extraction unit
5 in-model name determination unit
6 in-model name replacement unit
7 model abstraction unit
8 model output unit
9 in-model similarity calculation unit

The invention claimed is:
1. A software management device comprising:
an input device configured to receive a target model as an input from a user, the target model comprising at least one of a name or a function;
a storage device configured to store a plurality of terms comprising at least one of names or functions, the plurality of terms comprising a first set of terms associated with a first hierarchical level and a second set of terms associated with a second hierarchical level, the first hierarchical level being of lower hierarchy than the second hierarchical level; and a replacement processor configured to search for at least one replacement term from the plurality of terms in the storage device based on the at least one of the name or the function of the target model, the replacement processor further configured to:
    search the first set of terms associated with the first hierarchical level for the at least one replacement term,
    in response to not finding the at least one replacement term in the first set of terms associated with the first hierarchical level, search the second set of terms associated with the second hierarchical level for the at least one replacement term, and
    in response to not finding the at least one replacement term in the second set of terms associated with the second hierarchical level, determine that the at least one of the name or the function of the target model cannot be replaced.

2. The software management device according to claim 1, wherein:
    the at least one replacement term comprises a first replacement term from the first set of terms and a second replacement term from the first set of terms, such that the first replacement term and the second replacement term are associated with the first hierarchical level; and
    the software management device further comprises an abstraction processor configured to generate an abstraction model based on the at least one replacement term, the abstraction model comprising an abstraction term from the second set of terms such that the abstraction term is associated with the second hierarchical level, the abstraction term associated with the first replacement term and the second replacement term.

3. The software management device according to claim 1, wherein:
    the storage device further comprises a comparison reference model comprising at least one of a comparative name or a comparative function;
    the replacement processor provides at least two replacement candidate terms for the at least one replacement term; and
    the software management device further comprises a determination processor configured to select one of the at least two replacement candidate terms as the at least one replacement term based on a comparison between the at least one of the name or the function from the target model and the at least one of the comparative name or the comparative function from the comparison reference model.

4. The software management device according to claim 1, wherein:
    the plurality of terms stored in the storage device include synonyms of the at least one of the name or the function from the target model; and
    the first hierarchical level is a subordinate level and the second hierarchical level is a superordinate level.

5. The software management device according to claim 1, wherein the storage device is configured to store the plurality of terms as a tree structure based on hierarchical levels associated with the plurality of terms.

6. The software management device according to claim 3, wherein the determination processor is configured to select one of the at least two replacement candidate terms as the at least one replacement term based further on minimum edit needed to change the at least one of the name or the function from the target model to match each of the at least two replacement candidate terms.

7. The software management device according to claim 1, further comprising a similarity processor configured to determine a similarity between the at least one of the name or the function from the target model and the plurality of terms in the storage device.

8. The software management device according to claim 3, wherein:
    the plurality of terms stored in the storage device include synonyms of the at least one of the name or the function from the target model; and
    the first hierarchical level is a subordinate level and the second hierarchical level is a superordinate level.

9. The software management device according to claim 3, wherein the storage device is configured to store the plurality of terms as a tree structure based on hierarchical levels associated with the plurality of terms.

* * * * *